INVENTOR.
WILLI MEIER
BY  KARL RATH
ATTORNEY

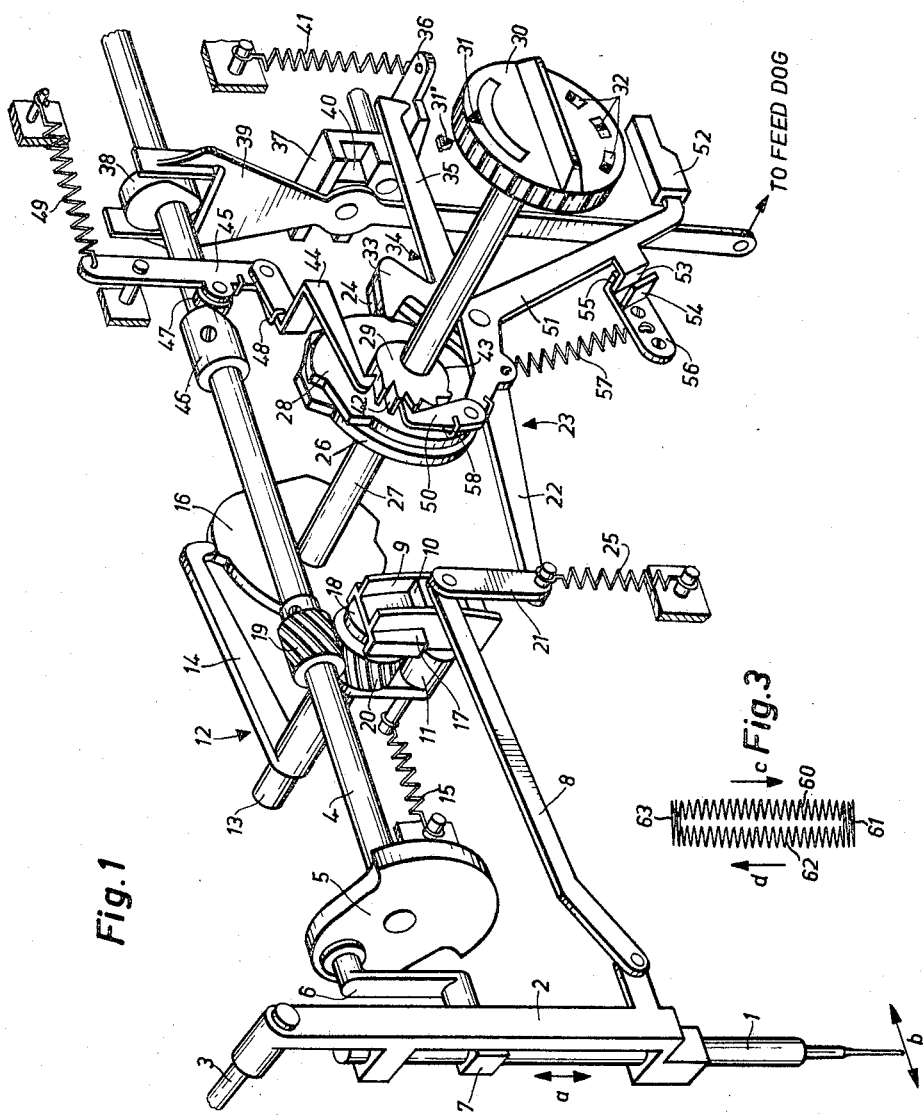

United States Patent Office 3,479,977
Patented Nov. 25, 1969

3,479,977
CONTROL APPARATUS FOR ZIGZAG SEWING MACHINES, IN PARTICULAR FOR THE PRODUCTION OF BUTTONHOLES
Willi Meier, Karlsruhe, Germany, assignor to G. M. Pfaff AG, Kaiserslautern, Pfalz, Germany, a corporation of Germany
Filed Apr. 4, 1967, Ser. No. 628,321
Claims priority, application Germany, Apr. 6, 1966, D 39,143
Int. Cl. D05b 3/06
U.S. Cl. 112—158                                7 Claims

ABSTRACT OF THE DISCLOSURE

A conventional zigzag sewing machine is adapted for the sewing of buttonholes by the consecutive operation of a control member, to change from one to the next buttonhole sewing phase. Three cams controlling the various buttonhole sewing phases are mounted upon a common control shaft and are operated from one to the next operating position by a ratchet also mounted upon said shaft. An oscillating control pawl is continuously intermittently operated towards and away from said ratchet by operative connection with the main drive shaft of the sewing machine. The normal working stroke of said pawl being insufficient to operably engage the ratchet teeth, actuation of said ratchet is effected by temporarily manually rotating or presetting the same by a predetermined angle, such by the aid of an auxiliary pawl operated by a control lever. With the pitch angle of the ratchet teeth being equal to the sum of the operating stroke of the first pawl and said presetting angle, actuation of the ratchet is controlled by operating said control member thus providing a relay effect by the ratchet being operated by the intermittently applied local power source and controlled by reduced effort on the control member.

---

The present invention relates generally to control means operated by a ratchet and pawl mechanism, to establish a series of consecutive operating conditions or phases of a machine, more particularly, though not limitatively, to control apparatus suitable for use in conjunction with zigzag sewing machines for the semi-automatic sewing of buttonholes by the establishment of consecutive buttonhole control positions by the aid of a control key or the like, that is, in respect to stitching position, overstitch width, and stitching direction, as required in connection with the consecutive operating phases of a buttonhole stitching cycle or operation.

In the production of buttonholes by means of zigzag sewing machines, it is customary to carry out the transition to the next following operating condition or phase of the sewing operation while the machine is in running or operating condition. Besides, it is possible with known zigzag sewing machines to switch from one to the next operating condition or buttonhole operating phase while the needle is still within the fabric or work being operated on. In such cases and, especially, with relatively slowly operating machines, the danger exists of breakage of the needle and/or lateral displacement or distortion of the fabric, whereby to deleteriously affect the appearance of the buttonhole produced, aside from other defects and drawbacks well known.

Accordingly, among the objects of the present invention is the provision of simple and efficient control apparatus for a buttonhole zigzag sewing machine, to establish the consecutive phases or operating conditions during a buttonhole sewing operation or cycle, said apparatus being substantially devoid of the above and related disadvantages and short-comings of existing buttonhole sewing control devices; wherein the operating steps for the consecutive controls of the operating conditions of the machine may be effected while the machine is in operation; wherein said control requires a minimum of effect on the part of the operator; and wherein the control operations are effected while the needle is outside the fabric during the consecutive stitching cycles of the machine.

The invention, both as to the foregoing and ancillary objects as well as novel objects thereof, will be better understood from the following detailed description, taken in conjunction with the accompanying drawings forming part of this specification and in which:

FIG. 1 is a perspective view of operating and control apparatus embodied in a buttonhole zigzag sewing machine constructed in accordance with the principles of the invention;

FIG. 3 illustrates diagrammatcially a buttonhole stitching pattern, explanatory of the operation of the invention.

Like reference numerals denote like parts in the different views of the drawings.

Figure 2A:
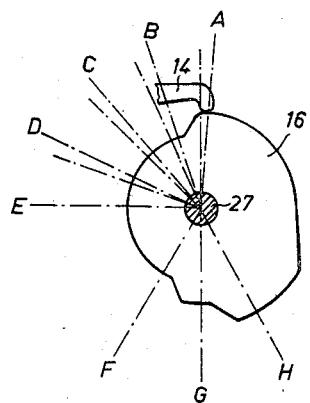
FIGS. 2A to 2D are detail views of the control cams and ratchet forming part of the apparatus according to FIG. 1, consecutive control positions thereof being indicated by dot-dash radial lines.

With the foregoing objects in view, the invention, according to one of its aspects, involves the provision, in conjunction with a zigzag sewing machine, of first, second and third control means to respectively vary the stitching position, the overstitch width and the stitching direction of the machine, of first, second and third control cam means mounted upon a common shaft and cooperating with first, second and third cam follower means, respectively, operably connected with the respective control means of the machine, said cam means designed to establish consecutive operating conditions of said machine by said control means for the sewing, in the order named, of first buttonhole side stitches in a first direction, of first buttonhole barring stitches and second buttonhole side stitches in the opposite direction, and second buttonhole barring stitches in said first direction, by the simple operation of the common control shaft of said cams, to rotate the same through their consecutive angular operating positions in relation to a predetermined starting position of said shaft.

There is further provided, in accordance with the invention, a ratchet for the control of said cam means also mounted upon said shaft and having teeth spaced in accordance with the successive operating positions of said shaft, said ratchet cooperating with an oscillating pawl being continuously and intermittently operated towards and away from the ratchet teeth by a local power source, such as the main drive shaft of the sewing machine. Preferably, the operations of said pawl, being synchronized with the needle stitching cycles of the sewing machine, occur while the needle is outside the fabric, with the normal operating stroke of the pawl being insufficient to effect operation or rotation of the ratchet. In order to operate the latter, to advance the device from one to the next buttonhole operating phase or position, there is provided, according to a further feature of the invention, manual control means including a control key or the like operating member, to temporarily angularly displace said ratchet by a predetermined angle, in such a manner as to enable actuation and rotation thereof to the next operating position by said pawl. The manual control means advantageously consist of an auxiliary pawl engaging said ratchet and operable by said key in cooperation with suitable stop means.

An arrangement of the foregoing type, being useful in connection with other types of ratchet and pawl operating mechanisms, provides a mechanical advantage by the actual power for the operation of the ratchet being supplied by the local power source, that is the drive shaft of the sewing machine in the example described, and by the control being effected with relatively reduced effort, whereby to result in increased accuracy and reliability of the operation, as will become further apparent as the description proceeds in reference to the drawings.

Referring more particularly to the drawings, the numeral 1 denotes the needle bar of a conventional zigzag sewing machine being mounted for vertical reciprocation in a needle bar frame 2, as indicated by the double arrow *a* in the drawing, and carrying a needle for cooperation with a looptaker (not shown), to produce stitches in the work being operated on. Frame 2 is mounted for oscillation about an axis or spindle 3 fast on the frame of the machine, to deflect the needle bar and with it the needle laterally, in respect to the work feed direction and in addition to its up and down movement, as indicated by the double arrow *b*, for the production of zigzag stitches in a manner well known and understood. The reciprocating movement of the needle is derived in a known manner from the main drive or arm shaft 4 of the machine, such as via a crank 5, link 6 and journal pin 7 affixed to the needle bar all being of conventional construction. Linked to the lower end of the needle bar frame 2 is a control rod or bar 8 whose opposite end is rotatively supported by a slide block 10 displaceable within a control guide or member 9.

Guide member 9 has its lower end pivoted or rotatively mounted upon the arm 11 of a double lever 12 which is in turn rotatively mounted upon an axis or spindle 13 fast upon the frame of the sewing machine. The remaining arm of the lever 12 resiliently engages the periphery of a control cam 16 by the action of a tension spring 15 arranged with one end connected to said lever and with its opposite end connected to the frame of the machine.

A fork-shaped extension 17 at the upper end of the guide member 9 embraces an eccentric 18 journalled upon the spindle 13, said eccentric being driven by the drive shaft 4 of the sewing machine by way of a worm 19 fast upon said shaft and meshing with a worm gear 20 affixed to the eccentric, whereby to oscillate the guide 9 about its rotary axis within the arm 11 of the lever 12.

Rotatively mounted upon the end of the control bar 8 connected to the slide block 10 is a link 21 to which is in turn linked an arm 22 of a double lever 23 rotatively supported by the frame of the sewing machine, the remaining arm 24 of said lever being resiliently urged against a further cam 26 by the action of a spring 25 arranged with one end connected to the pivot between the link 21 and arm 22 and with its opposite end connected to the frame of the machine.

Both the cam 26 and the previously described cam 16 are fixedly mounted upon a control shaft or spindle 27 rotatively mounted upon the frame of the machine, said shaft having affixed thereto a further cam 28 and a ratchet 29 and terminating in a control knob or disk 30 affixed to its outer end protruding beyond the casing of the sewing machine. Knob 30 is fitted with a first index mark 31, serving for the setting or adjustment of the device to the starting position of a buttonhole sewing cycle or operation, and a set of auxiliary indices 32 serving for the setting of the "Center," "Left," and "Right" needle stitching positions in using the machine for ordinary straight or zigzag stitching. Index marks 31 and 32 cooperate with a stationary index 31' disposed upon the frame of the machine above the knob 30.

Cooperating with the cam 28 is an arm 33 of a further double lever 34 rotatively supported by the frame of the sewing machine and whose opposite arm 35 engages an extension or abutment 36 of the guide 37 of a conventional stitch controller forming part of the sewing machine.

Further mounted upon the main drive shaft 4 of the machine is an eccentric 38 embracing the forked end of a lever 39 to an intermediate point of which is linked the guide block 40 of the stitch controller movable within the guide 37. Depending upon the angular position of the guide 37, controlled by the lever arm 35, the feed stroke and feed direction of the work feed dog (not shown) of the sewing machine, operably connected in known manner to the lower end of the work 39, may be varied or adjusted, in a manner well known to those skilled in the art. A spring 41, having one end connected to the frame of the machine and having its opposite end connected to the abutment 36, acts to urge the guide 37 against the arm 35 of the lever 34, to in turn cause the lever arm 33 to resiliently engage the cam 28.

Cooperating with the ratchet disk 29, having only part of its circumference fitted with ratchet teeth 42 while the remaining part 43 is smooth and free from such teeth, is an oscillating control pawl 44 which is linked to the lower arm of a control lever 45 rotatively mounted upon the frame of the sewing machine. Lever 45 is continuously intermittently deflected, once during each needle operation or stitching cycle of the sewing machine, by the action of a cylindrical cam 46 mounted upon the main drive shaft 4 and engaging a roller 47 carried by the lower arm of the lever 45, a tension spring 49, having one end connected to said lever and having its opposite end connected to the frame of the machine, acting to urge the roller 47 against the cam 46, and a torsion spring 48, engaging the pawl 44 and lever 45, respectively, serving to resiliently urge said pawl against the periphery of the ratchet 29.

Cooperating with the ratchet 29 is a second control pawl 50 which is linked to an arm of a double lever 51 rotatively mounted upon the frame of the sewing machine and fitted, at its opposite extremity, porjecting beyond the housing of the sewing machine, with a control key 52. Lever 51 has a lug 53 disposed between a pair of fixed stops or abutments 54 and 55 upon a support or carrier 56 connected to the frame of the machine. A coil spring 57, having one end connected to the carrier 56 and having its opposite end connected to the lever 51, acts to normally urge the lug 53 against the abutment 55 as shown in FIG. 1, while a torsion spring 58, engaging the pawl 50, on the one hand, and the lever 51, on the other hand, acts to resiliently urge said pawl against the ratchet 29.

FIG. 1 shows the control device with its individual elements in the position for the starting of a buttonhole sewing operation or cycle. To this end, the control knob 30 has been set to a position shown with its index mark 31 coinciding with the stationary index 31'. FIGS. 2A, 2B, 2C, and 2D are detail views more clearly showing the construction of the cams 16, 26, 28 and the ratchet 29, respectively, in their positions relative to the associated actuating members 14, 24, 33, 44, and 50 as indicated by the radial dot-dash lines A to H for ease of illustration and explanation of the operation of the invention as follows.

More particularly, the shape or design of the control cams 16, 26 and 28 is such that at the position A, that is, at the start of a buttonhole sewing operation, the guide 9 is adjusted to the central stitching position by the cam 16 and via the lever 12. At the same time, the cam 26 displaces, via the double lever 23, link 21 the slide block 10 within the guide 9 to a position, whereby to cause a relatively small overstitch width in the direction of the arrow *b*, say 1.6 mm., suitable for the sewing of the side stitches of the buttonhole to be produced. Besides, the guide 37 in this position of the stitch controller is deflected, via the double lever 34 and the cam 28, to provide a minimum feedstroke or stitching length, suitable for the sewing of buttonhole zigzag stitches, in the normal or forward stitching direction of the sewing machine.

During this operation of the sewing machine, or position A of the control cams 16, 26 and 28, the eccentric 18 is driven by the main drive shaft 4 via worm gears 19, 20, whereby to oscillate the control guide 9 about its axis within the arm 11 of the lever 12. This oscillating movement of guide 9 is imparted, via the slide block 10 and arm 8, to the needle bar frame 2 and, in turn, to the needle bar 1, whereby to sew the right line of buttonhole zigzag stitches 60, FIG. 3, as indicated by the arrow c in the drawing.

During this latter operation of the sewing machine, each revolution of the main drive shaft 4 causes the link or pawl 44 to oscillate by the action of the cam 46 and actuating lever 45, the arrangement of the cam 46 relative to the shaft 4 being such as to cause the intermittent operative strokes of the lever 45 to occur during the intervals of the needle being outside of or in the Up-position relative to the fabric being operated on. Besides, the design of the cam 46, lever 45 and pawl 44 are such as to cause the effective operating stroke of the pawl or link 44 during all of the operating positions A to E of the device to cover an angle $\alpha$, FIG. 2D, which is less than the pitch angle of the ratchet teeth 42, whereby to normally prevent actuation of the ratchet 29 by the pawl 44. In other words, ratchet 29 cannot be advanced by the pawl 44 due to its limited normal normal operating stroke preventing it from engaging behind the teeth 42 for advancing or rotating the ratchet in clockwise direction, in the case of the example shown by the drawing.

After reaching the desired length of the side stitches 60 for the buttonhole being sewn, FIG. 3, the ratchet 29 together with the control shaft 27 is rotated manually in clockwise direction, via the auxiliary pawl 50 and lever 51, by temporary depression of the key 52 to an extent, to cause the lug 53 to engage the stop or abutment 54.

As a consequence, the oscillating lever 45 actuated by the cam 46 is now advanced, while the needle of the sewing machine is outside the fabric, to a position to enable the pawl 44 to engage behind a tooth of the ratchet 29 due to preceding rotation of the latter by an angle $\beta$ during depression of the key 52. The pawl 29 is thus advanced in clockwise direction by one tooth to its position B, together with the remaining cams upon shaft 27, for the sewing of the first barring stitches 61 of the buttonhole, FIG. 3.

In other words, the angular distance or pitch of the ratchet teeth 42 amounts to $\alpha+\beta$, whereby the pawl 44, having a normal operating stroke $\alpha$, is enabled to engage said teeth and advance the ratchet after the depression of the key 52 only from its normal or rest position shown in the drawing. As a consequence, only after the key 52 has been depressed and the ratchet 29 preset or rotated in the clockwise direction by an angle $\beta$, is the pawl 44 enabled to operably engage the teeth 42, to thereby advance the shaft 27 and control cams 16, 26 and 28 from one to the next operating positions A to E during a complete buttonhole sewing cycle or operation.

Figure 2B:
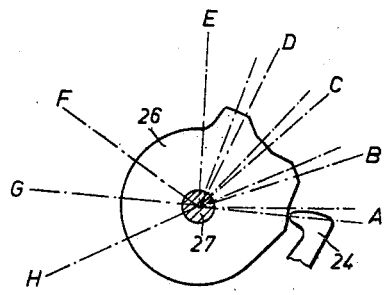
Figure 2C:
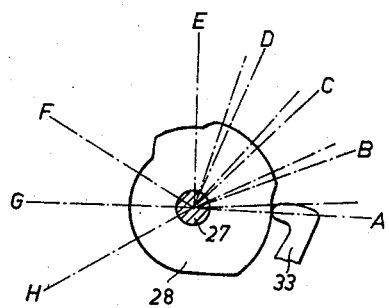
Figure 2D:
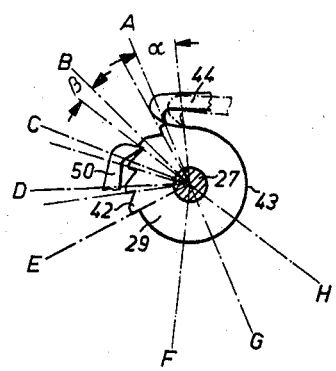

As a result of the operation of the ratchet in the manner described, the cams 16, 26 and 18 are progressively rotated, by the successive actuations of the key 52, by equal angular amounts from their position A to the positions B, C, D, and E, that is, the actuating organs 14, 24 and 33 engage the cams at points corresponding to the dot-dash radial lines, FIGS. 2A, 2B and 2C, shown in the drawing in the respective operating positions of the device. As a consequence, cam 16 in position B causes a deflection of the guide 9 from its "Center" to its "Left" position, cam 26 causes the guide block 10 to be displaced within the guide 9 from its previous position corresponding to an overstitch width of 1.6 mm., to a position corresponding to an overstitch width of say 3.5 mm., suitable for the sewing of the buttonhole barring stitches 61, while cam 28 causes a deflection of the guide 37 of the stitch controller, to change from forward to reverse stitching while maintaining a minimum stitching length suitable for producing buttonhole zigzag stitches. In this position, therefore, that is, position B of the shaft 27, the machine continues to sew the first or lower barring stitches 61 of the buttonhole, FIG. 3.

After completion of the barring stitches 61, renewed manual depression of the key 52 causes the control shaft 27 to be rotated, in the same manner as described, to the position C of the cams 16, 26 and 28, whereby cam 26 causes the slide block 10 to be returned to its original position within the guide 9 corresponding to an overstitch width of 1.6 mm., in the example mentioned. In this position, therefore, the machine is enabled to continue the sewing of the line or row of left buttonhole stitches 62, as indicated by the arrow d in FIG. 3.

After the sewing of the left side stitches 62, the buttonhole is again fitted with upper barring stitches 63 in the manner described by renewed depression of the key 52, whereby pawl 44 advances the ratchet 29 to the position D, with the overstitch width being again increased to 3.5 mm. by the cam 26, in the manner described and understood from the foregoing.

Upon subsequently finally depressing the key 52, the ratchet 29 is rotated to the position marked E in the drawing in which the overstitch width is reduced to practically zero or straight stitching and the stitching length retained at its minimum by the stitch controller via cam 28, for the sewing of a few final locking stitches, to firmly anchor the buttonhole in the fabric.

Due to the lack of teeth 42 within the section 43 of the ratchet 29, further rotation of the control shaft 27 from the final operating position E, by inadvertent depression of the key 52 or due to other cause, is avoided safely.

In order to start the sewing of a new buttonhole, the knob 30 is again rotated to the starting position shown in FIG. 1 for the commencement of a new operating cycle in the manner described.

It is understood that the button hole sewn in the manner described is subsequently cut, either manually or automatically, along a line intermediate the side stitches 60 and 62 by the aid of a suitable buttonhole cutting knife, in a manner well known to those skilled in the art.

In order to enable the machine to be used for ordinary sewing, knob 30 is adjusted to any of the auxiliary positions denoted by the marks 32, corresponding to the angular positions F, G and H of the cams 16, 26 and 28. In the latter positions, the cams 26 and 28 are ineffective, while the cam 16 provides for simple stitching at the "Left," "Center" and "Right" positions by a corresponding adjustment in accordance with the marks 32.

In the foregoing the invention has been described in respect to an exemplary illustrative device. It will be evident, however, that variations and modifications, as well as the substitution of equivalent parts or elements for those shown and described herein for illustration, may be made without departing from the broader scope and spirit of the invention. The specification and drawings are accordingly to be regarded in an illustrative rather than in a restrictive sense.

I claim:

1. A buttonhole zigzag sewing machine comprising in combination:
   (1) a main drive shaft,
   (2) a reciprocatory stitching needle operably connected to said shaft,
   (3) first control means to vary the needle stitching position, second control means to vary the overstitch width, and third control means to vary the stitching direction,
   (4) first, second and third cam means mounted upon a common control shaft,
   (5) first, second and third cam follower means cooperating with said first, second and third cam means and operably connected with said first, second and third control means, respectively.
   (6) said cam means being designed to establish consecutive buttonhole cycle sewing adjustments of said first, second and third control means by predetermined consecutive angular displacements of said shaft, (7) a ratchet mounted upon said shaft having teeth the pitch of which corresponds to said predetermined angular displacement, (8) an oscillating control pawl to operate said ratchet being operably connected with said main drive shaft means on said main shaft, to continuously reciprocate said pawl with its operative stroke occurring while said needle is outside the work being operated on, (9) the stroke of said control pawl being less than the pitch of said ratchet teeth, to normally prevent actuation of said ratchet, and

(10) manually actuatable control means to act on said ratchet and temporarily angularly displace said ratchet, to enable operation of said ratchet by said pawl from one to the next ratchet tooth.

2. In a buttonhole sewing machine as claimed in claim 1, including indicating means to enable adjustment of said shaft to the starting position of a buttonhole sewing operation.

3. In a buttonhole sewing machine as claimed in claim 1, wherein said ratchet has a first toothed section and a second smooth peripheral section and wherein said cam means have first and second sections, the first section of said cam means being coordinated with said first ratchet section and designed for the control of a buttonhole sewing cycle and the second section of said cam means being coordinated with said second ratchet section and designed for normal stitching, and index means associated with said manual control means, to ascertain the normal and buttonhole sewing positions of said machine.

4. In a buttonhole sewing machine as claimed in claim 3, said normal stitching comprising straight stitching at predetermined stitching positions of said machine.

5. In a buttonhole sewing machine as claimed in claim 1, said control means being comprised of a further pawl engaging said ratchet, a lever carrying a control key and said further pawl, resilient means to urge said lever against a first abutment, and a second abutment to fix the deflection of said lever against the action of said resilient means, whereby to preset said ratchet in the direction of said first pawl by deflection of said lever by said key, to enable actuation of said ratchet by said first pawl from one to the next buttonhole sewing adjustment of said machine.

6. In a buttonhole sewing machine as claimed in claim 1, the pitch of the teeth of said ratchet being equal to the sum of the operating stroke of said first pawl and the displacing angle of said ratchet.

7. A buttonhole zigzag sewing machine comprising in combination:

(1) a main drive shaft, (2) a reciprocatory stitching needle operably connected to said shaft, (3) first control means to vary the needle stitching position, second control means to vary the overstitch width, and third control means to vary the stitching direction, (4) first, second and third cam means mounted upon a common control shaft, (5) first, second and third cam follower means cooperating with said first, second and third cam means and operably connected with said first, second and third control means respectively, (6) said cam means being designed to establish consecutive buttonhole cycle sewing adjustments of said first, second and third control means by predetermined consecutive angular displacements of said shaft, (7) a ratchet mounted upon said shaft having teeth the pitch of which corresponds to said predetermined angular displacement, (8) an oscillating control pawl to operate said ratchet, synchronizing means on said main drive shaft operably connected to said pawl to continuously reciprocate said pawl with its operative stroke occurring while said needle is outside the work being operated on, (9) said ratchet arranged to normally prevent actuation by said pawl, and

(10) manually actuatable control means to act on said ratchet and temporarily restore the operativeness of said pawl, to enable operation of said ratchet by said pawl from one to the next ratchet tooth.

References Cited
UNITED STATES PATENTS

| | | | |
|---|---|---|---|
| 2,641,211 | 6/1953 | Minkowitz | 112—73 |
| 3,130,697 | 4/1964 | Meier. | |
| 3,148,645 | 9/1964 | Shigeo Aiki et al. | |
| 3,149,591 | 9/1964 | Shigeo Aiki et al. | |
| 3,215,104 | 11/1965 | Bono. | |

RICHARD J. SCANLAN, JR., Primary Examiner

UNITED STATES PATENT OFFICE
CERTIFICATE OF CORRECTION

Patent No. 3,479,977 November 25, 1969

Willi Meier

It is certified that error appears in the above identified patent and that said Letters Patent are hereby corrected as shown below:

In the heading to the printed specification, line 10, "D 39,143" should read -- P 39,143 --.

Signed and sealed this 5th day of January 1971.

(SEAL)
Attest:

Edward M. Fletcher, Jr.
Attesting Officer

WILLIAM E. SCHUYLER, JR.
Commissioner of Patents